United States Patent [19]

Permuy

[11] Patent Number: 5,311,140
[45] Date of Patent: May 10, 1994

[54] CIRCUIT FOR MEASURING VARIATIONS IN THE CAPACITANCE OF A VARIABLE CAPACITOR USING A CONTINUOUSLY REBALANCED DETECTION BRIDGE

[75] Inventor: Alfred Permuy, Paris, France

[73] Assignee: Societe d'Applications Generales d'Electricite et de Mecanique Sagem, France

[21] Appl. No.: 924,049

[22] PCT Filed: Dec. 28, 1990

[86] PCT No.: PCT/FR90/00961
§ 371 Date: Aug. 28, 1992
§ 102(e) Date: Aug. 28, 1992

[87] PCT Pub. No.: WO91/09812
PCT Pub. Date: Jul. 11, 1991

[30] Foreign Application Priority Data

Dec. 29, 1989 [FR] France .................. 89 17551

[51] Int. Cl.⁵ ............................................. G01R 27/26
[52] U.S. Cl. .................................. 324/680; 324/132; 324/610; 324/673; 307/359; 73/765
[58] Field of Search ............... 324/132, 610, 658, 666, 324/673, 680; 364/573; 73/765, 766; 307/320, 359, 491, 494

[56] References Cited

U.S. PATENT DOCUMENTS

4,241,303 12/1980 Thompson .
4,673,869 6/1987 Michael .
4,684,886 8/1987 Doyle .

FOREIGN PATENT DOCUMENTS

2659807B2 7/1977 Fed. Rep. of Germany .
62-168408 11/1985 Japan .

*Primary Examiner*—Gerard R. Strecker
*Assistant Examiner*—Diep Do
*Attorney, Agent, or Firm*—Bacon & Thomas

[57] ABSTRACT

A circuit for measuring variations in the capacitance of a variable capacitor forming part of a sensor includes an oscillator which generates an alternating signal which is supplied to two branches of a detection bridge. The first branch includes the variable capacitor connected in series with a variable capacitance diode. The second branch includes a capacitor connected in series with a variable capacitance diode. A differential stage has each of its in puts connected to the common point of a respective one of the branches. Synchronous demodulation means connected to the oscillator, are connected to the output of the differential stage for delivering a DC unbalance voltage Ve which is injected by a feedback line to the common point of the first branch, thereby continuously balancing the detection bridge.

14 Claims, 4 Drawing Sheets

CIRCUIT FOR MEASURING VARIATIONS IN THE CAPACITANCE OF A VARIABLE CAPACITOR USING A CONTINUOUSLY REBALANCED DETECTION BRIDGE

FIELD OF THE INVENTION

The present invention relates to the technical field of circuits for measuring in the general sense, and adapted to determining variations in the capacitance of a capacitor that is variable.

PRIOR ART

Numerous measurement circuits have already been proposed in the prior art for detecting variations in capacitance, and suitable for delivering an electrical signal representative of the magnitude being measured. Such a signal is used for application to electronic processing systems for the purpose, for example, of automatic monitoring, measuring, regulation, or control.

Such measurement circuits are conventionally constituted by an electrical circuit called a conditioner which is directly associated with the capacitive sensor to deliver the electrical signal representative of variations in the capacitance of the sensor, which variations are related to changes in the physical magnitude to be measured. Such circuits for measuring the capacitance of a capacitor generally also include a linearizing circuit associated with the conditioner for the purpose of correcting the lack of linearity in the sensor or optionally also in the conditioner, in the event that the sensor or the conditioner departs from linearity in its operating range so that sensitivity can not be considered as being constant, given the accuracy required of the measurements. For example, lack of linearity exists when using a capacitive sensor constituted by a cantilevered beam that includes a sensitive element forming a moving plate placed in a distance relationship relative to a stationary plate on a support on which the sensitive element is fixed.

It should initially be observed that the conditioners at present in use have components that prevent them from being integrated and they are suitable for operating over a very limited temperature range only.

A first type of linearization circuit makes use of digital linearization techniques requiring the use of an analog-to-digital converter, a memory for attributing a stored value to each value of the electrical signal which is used for addressing the memory, and a digital-to-analog converter. Although quick and simple to implement, such linearization circuits are not cheap since accuracy is directly related to memory capacity.

A second type of linearization circuit makes use of analog techniques with diodes. The use of such circuits is limited in practice to linearizing an electrical signal for which the error curve slopes in a single and predetermined direction.

The present invention therefore seeks to remedy the above-mentioned drawbacks by providing a circuit for measuring variations in the capacitance of a capacitor, that presents good lack of sensitivity to stray capacitance and to electrical disturbances, and that is suitable for miniaturization as an integrated circuit.

The invention also seeks to provide a measurement circuit suitable for correcting the lack of linearity in an electrical signal for which the error slopes in various directions.

The invention also seeks to provide a measurement circuit suitable for correcting the lack of linearity that occurs between variations in the capacitance of the sensor and the electrical signal delivered, and that is relatively cheap in cost.

SUMMARY OF THE INVENTION

To achieve the above-specified objects, the present invention provides a circuit for measuring variations in the capacitance of a variable capacitor constituting, in particular, a sensor, the circuit comprising:

an oscillator generating an alternating signal;

a detection bridge comprising first and second branches connected to the oscillator, the first branch including the variable capacitor connected in series with a variable capacitance diode, while the second branch comprises a capacitor connected in series with a variable capacitance diode;

a differential stage having its inputs connected to respective ones of the branches at their common points between their capacitors and their variable capacitance diodes;

a DC bias circuit for biasing the common point of the second branch, serving to fix the equilibrium point of the detection bridge; and a feedback line injecting the output signal delivered by the differential stage to the common point of the first branch to continuously rebalance the detection point and consequently to continuously measure the variation in the capacitance of the variable capacitor.

Advantageously, the measurement circuit of the invention includes a circuit for linearizing the unbalance signal of the detection bridge and comprising:

n threshold differential units each receiving as inputs the unbalance signal and a respective reference voltage, and each delivering an output signal in the form of a current which varies in a manner that includes a portion of zero slope connected to a portion of determined slope by means of an angle point defined by the reference voltage; and n means for combining the currents from the differential units, thereby obtaining a resultant signal having multiple angle points which, when combined with the unbalance signal, enables it to be linearized.

Various other characteristics appear from the following description made with reference to the accompanying drawings which show embodiments of the invention by way of non-limiting example.

BEST METHOD OF PERFORMING THE INVENTION

Figure 1:
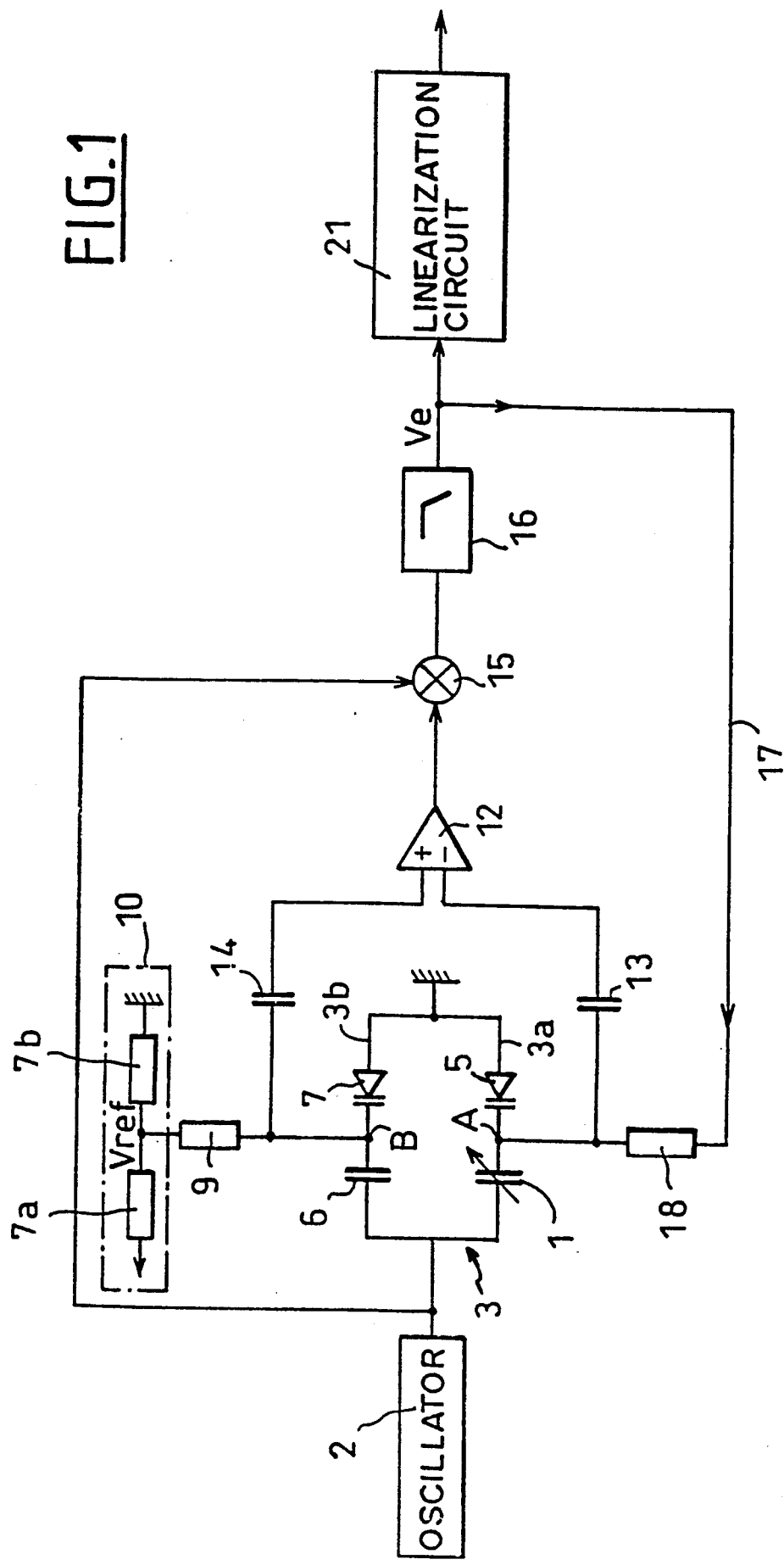
FIG. 1 is a circuit diagram showing an embodiment of the measurement circuit of the invention.

FIG. 1 shows an embodiment of a measurement circuit adapted to determine the variations in the capacitance of a variable capacitor 1. Advantageously, the capacitor 1 constitutes a capacitor sensor for physical magnitudes such as force, pressure, or acceleration. In a preferred embodiment, the capacitive sensor is in the form of a cantilevered beam made from a monolithic semiconductor substrate and including at least one flexible element of determined thickness connected to an anchor block on the substrate. The flexible element provides a moving plate for the variable capacitor whose stationary plate is constituted by a conductive zone formed on the substrate.

The measurement circuit of the invention seeks to detect variations in the capacitance of the capacitor 1, enabling an electrical signal to be delivered which is representative of the measured magnitude. To this end, the measurement circuit includes an oscillator 2 generating an alternating signal, e.g. of the squarewave type, having a frequency of the order of 1 MHz and an amplitude of the order of a few volts. The measurement circuit includes a detection bridge 3 formed by first and second branches $3a$ and $3b$ connected between the oscillator 2 and ground.

The first branch $3a$ is constituted by the capacitor 1 connected in series with a variable capacitance diode 5. The diode 5 is biased to behave like a capacitor whose capacitance is suitable for being controlled by a voltage. To this end, the anode of the diode 5 is connected at a common point A to one of the plates of the capacitor 1.

The second branch $3b$ comprises a capacitor 6 connected in series with a variable capacitance diode 7 that is identical to the diode 5. The common point B between the capacitor 6 and the anode of the diode 7 is connected by means of a DC bias resistor 9 to a circuit 10 for applying DC bias to the point B and thus to the diode 7 for fixing the equilibrium point of the detection bridge. The bias circuit 10 is suitable for delivering a reference voltage Vref, which is preferably adjustable, and which is formed in this example by a divider bridge comprising resistors $7a$ and $7b$.

It should be observed that the variable voltage is chosen so that the variable amplitude of the signal across points A and B is small relative to that of the reference voltage. In addition, the capacitor 6 may also constitute a variable capacitance sensor, enabling differential capacitance sensing to be performed.

The common points A and B of the first and second branches $3a$ and $3b$ are connected to the inputs of a differential stage 12 via respective coupling capacitors 13 and 14 suitable for blocking the DC component of the signal from the detection bridge. Advantageously, the differential stage 12 is constituted by an amplifier whose non-inverting input is connected to common point B and whose inverting input is connected to point A.

Figure 2:
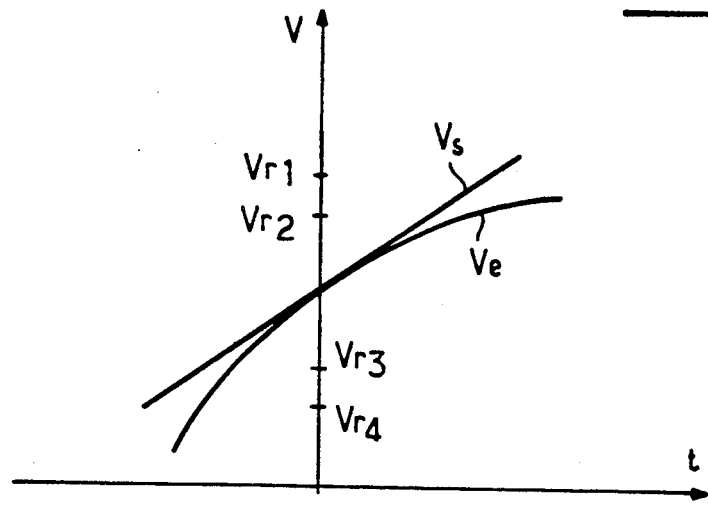
FIG. 2 is a graph showing the appearance of the electrical signal delivered at a characteristic point of the measurement circuit of the invention.

The amplifier 12 is connected to a synchronous signal detection circuit 15 which receives synchronization information from the oscillator 2. The synchronous detection circuit 15 is made in conventional manner and is connected to a lowpass filter 16 having an appropriate cutoff frequency, e.g. of the order of 50 Hz. The output from the filter 16 is connected to the common point A of the first branch by a feedback line 17 having a DC bias resistor 18 for the diode 5 connected therein. The feedback to the detection bridge 3, and in particular to the branch containing the variable capacitance, serves to provide continuous rebalancing of the detection bridge. Thus, the signal Ve delivered by the filter 16 as shown in FIG. 2 corresponds to the unbalance signal of the bridge, thereby making it possible continuously to measure variation in the capacitance of the variable capacitor 1.

The filter 16 is advantageously followed by a circuit 21 for linearizing the unbalance signal Ve of the bridge and adapted to correct for the lack of linearity in the sensor 1 and the diodes 5 and 7. In accordance with the invention, the linearization circuit 21 includes at least one, and in the example shown in FIG. 3 four, differential threshold units $U_1$ to $U_4$, each having a first input 22 receiving the unbalance signal Ve and a second input 23 receiving a respective reference voltage $Vr_1$ to $Vr_4$. Each unit $U_1$ to $U_4$ delivers a respective output current $I_1$ to $I_4$ which varies in accordance with a relationship that includes a portion of zero slope connected to a portion of determined slope via an angle point defined by the corresponding reference voltage.

Figure 4A:
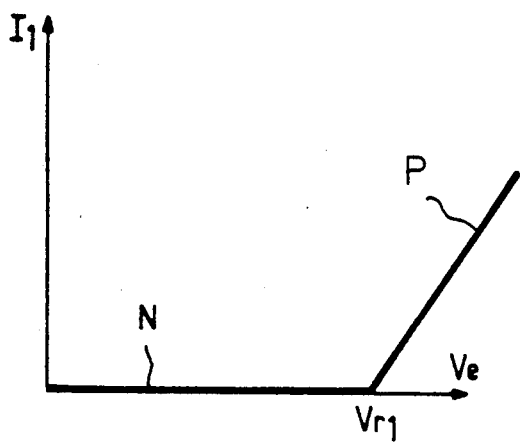
FIG. 4A to FIG. 4E to curves showing the principle on which the linearization circuit of the invention operates.
Figure 4B:
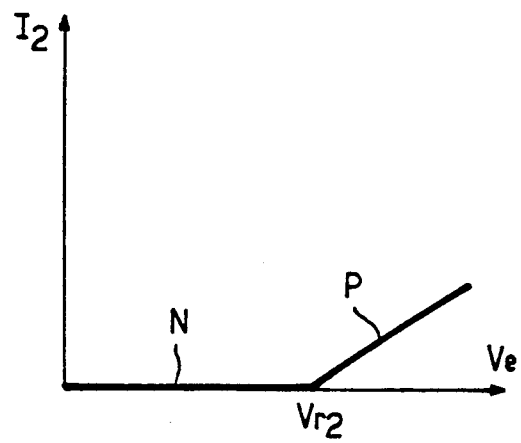

As can be seen more clearly in FIGS. 4A and 4B, at least one, and for example two of the differential units $U_1$ and $U_2$ deliver respective output currents $I_1$ and $I_2$ that vary in compliance with a relationship having a portion N of zero slope for any value of the unbalance signal Ve lower than the corresponding reference voltage $Vr_1$ or $Vr_2$, and a portion P of determined slope for any value of the signal Ve greater than the voltage $Vr_1$ or $Vr_2$, which thus corresponds to the angle point of the curve.

Advantageously, the linearization circuit also includes at least one, and in the example shown two, differential units $U_3$ and $U_4$ which deliver respective output signals $I_3$ and $I_4$ (see FIGS. 4C and 4D) which vary in a manner that includes a portion N of zero slope for any value of the unbalance signal greater than the corresponding reference voltage $Vr_3$ or $Vr_4$, and a portion P of determined slope for any value of the unbalance signal lower than the corresponding reference voltage. It should be observed that the plane portion M of the curve extending the sloping portion P is not used in the circuit of the invention.

Figure 3:
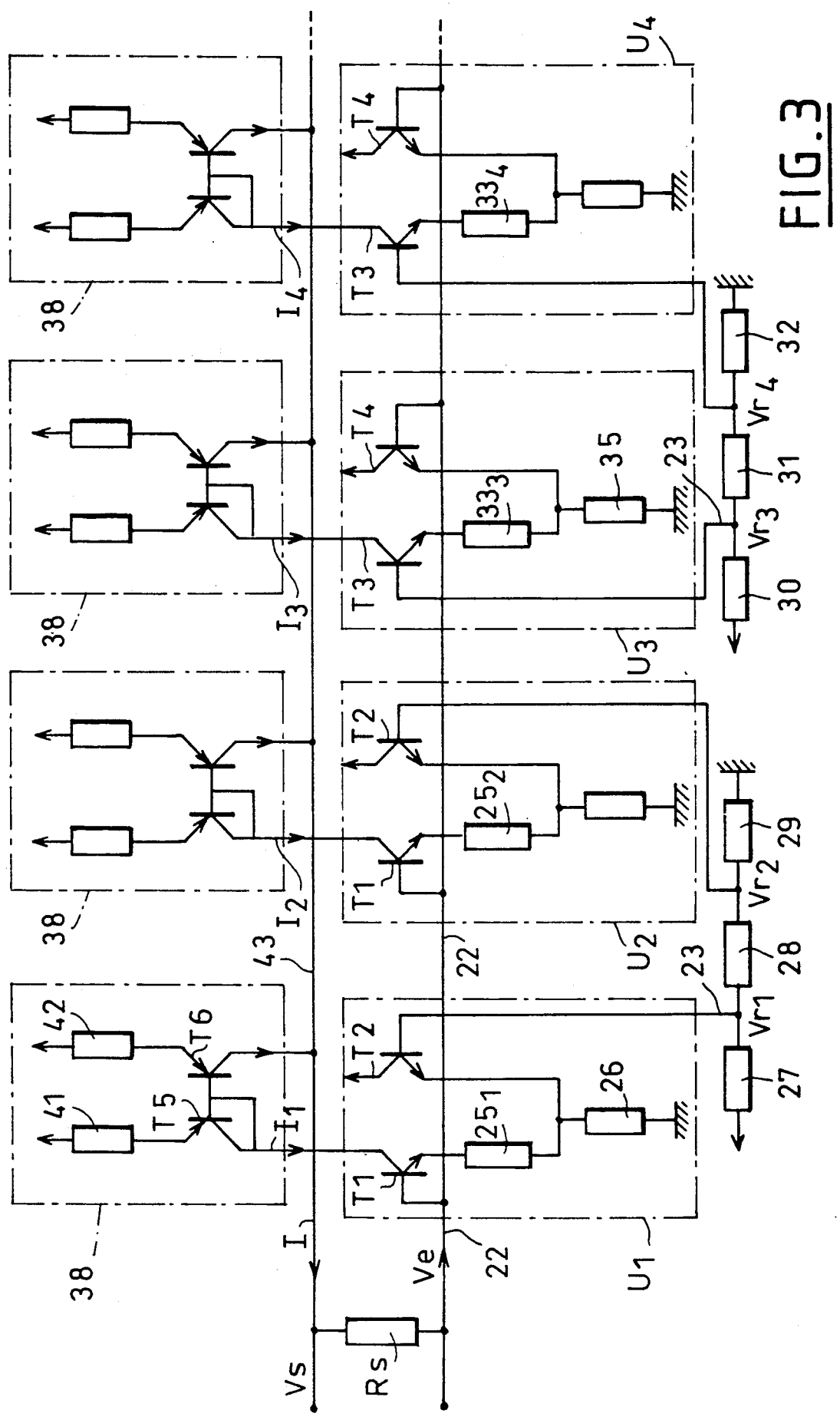
FIG. 3 is a circuit diagram showing a characteristic detail of the linearization circuit of the invention.

FIG. 3 shows an embodiment of the threshold differential units $U_1$ to $U_4$ suitable for delivering an output signal having the characteristics specified above. Each differential unit $U_1$, $U_2$ includes an NPN type transistor $T_1$ whose base receives the unbalance signal Ve. The emitter of transistor $T_1$ in differential units $U_1$ and $U_2$ is connected via a respective resistor $25_1$, $25_2$ to the emitter of an NPN type transistor $T_2$. The emitter of transistor $T_2$ is connected via a resistor 26 to ground and the collector of transistor $T_2$ is connected to a bias voltage. The base of transistor $T_2$ in each unit $U_1$, $U_2$ receives the corresponding reference signal $Vr_1$ and $Vr_2$ which is delivered, for example, by means of a voltage divider bridge as formed by resistors 27, 28, and 29.

The operation of each of the differential units stems directly from the description given above. If the signal Ve presents a voltage lower than a reference voltage $Vr_1$, $Vr_2$, then the corresponding transistor $T_1$ is switched off, such that the current $I_1$, $I_2$ leaving the collector of the transistor is zero. If the voltage Ve has a value greater than a reference voltage $Vr_1$, $Vr_2$, then the collector of transistor $T_1$ delivers a current such that:

$$I_1 = (Ve - Vr_1)/r25_1$$

and $$I_2 = (Ve - Vr_2)/R25_2$$

It should be observed that the slope of the curve specifying variation in the currents $I_1$, $I_2$ (FIGS. 4A, 4B) is determined by the resistance $R25_1$ or $R25_2$ of the corresponding resistor $25_1$ or $25_2$. In addition, the angle point of the curve is defined directly by the reference voltage $Vr_1$ or $Vr_2$.

As can be seen more clearly in FIG. 3, each of the differential units $U_3$ and $U_4$ comprises a transistor $T_3$ whose base receives the corresponding reference signal $Vr_3$, $Vr_4$ which is provided, for example, by a divider bridge 30, 31, and 32. The emitter of transistor $T_3$ in the differential units $U_3$ and $U_4$ is connected to the emitter of a transistor $T_4$ via a respective resistor $33_3$ or $33_4$. The emitter of transistor $T_4$ is connected via a resistor 35 to ground, while the collector of transistor $T_4$ is connected to a bias voltage. The base of transistor $T_4$ receives the unbalance signal Ve.

Figure 4D:
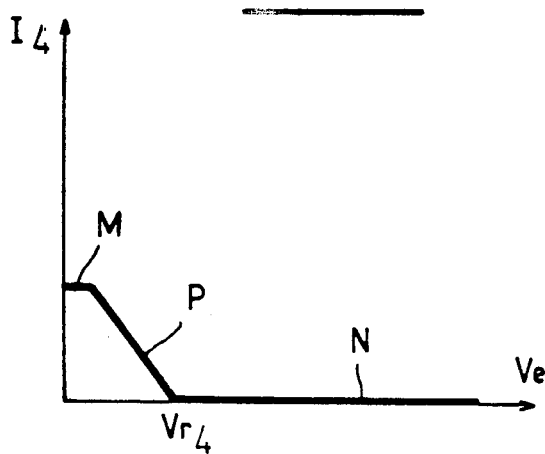
Figure 4C:
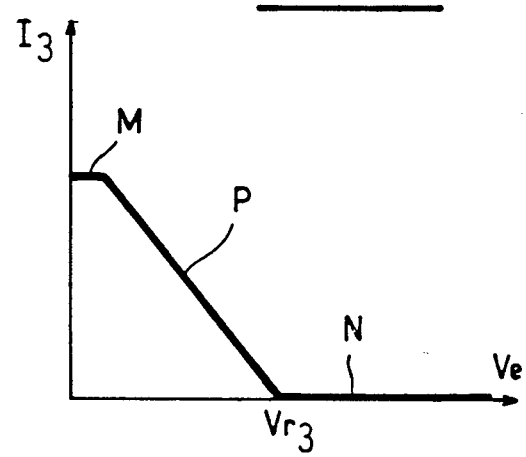

If the voltage value of the signal Ve is greater than the reference voltage $Vr_3$ or $Vr_4$, then the transistor $T_3$ is switched off, such that the current $I_3$ or $I_4$ leaving the collector of transistor $T_3$ is zero (FIGS. 4C, 4D). If the value of the voltage Ve is less than that of the reference voltage $Vr_3$ or $Vr_4$, then the transistor $T_3$ conducts and delivers a current as follows:

$$I_3 = (Vr_3 - Ve)/R33_3$$

and $$I_4 = (Vr_4 - Ve)/R33_4$$

The slope of variation in the currents $I_3$ and $I_4$ can thus be adapted as a function of the resistances $R33_3$ and $R33_4$ chosen for the resistors $33_3$ and $33_4$. Similarly the angle point of said relationship is directly determined by the reference voltages $Vr_3$ and $Vr_4$.

Figure 4E:
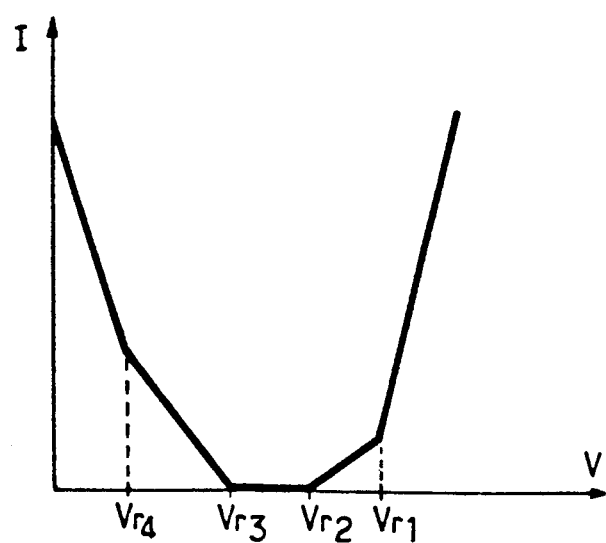

As can be seen more clearly in FIG. 3, each differential unit $U_1$ to $U_4$ is associated with means 38 for combining the currents $I_1$ to $I_4$ from the differential units so as to obtain a resultant current I which is an image of all of the currents delivered by the differential units. In the example shown, the combination means 38 are constituted by respective current mirrors which are connected together to add the currents $I_1$ to $I_4$, thereby obtaining a resultant I which varies in the manner shown in FIG. 4E.

By way of example, each current mirror 38 comprises a PNP type transistor $T_5$ whose collector is connected to its base and to the collector of the transistor $T_1$. The emitter of transistor $T_5$ is provided with a bias resistor 41 and the base of transistor $T_5$ is connected to the base of a transistor $T_6$ whose emitter is connected to a bias resistor 42. The collector of transistor $T_6$ is connected to a collecting line 43 which is connected to the collectors of the transistors $T_6$ of the other current mirrors 38. It should be observed that the resistances selected for the resistors 41 and 42 serve to adjust the slopes of the variation of currents $I_1$ to $I_4$.

The resultant current I can then flow through a resistor Rs so as to be combined with the signal Ve to obtain a linearized output signal Vs such that:

$$Vs = Ve + Rs.I$$

The linearization circuit of the invention thus makes it possible to linearize an electrical signal in which the error varies with opposite slopes, as can clearly be seen in FIG. 2.

Naturally the linearization circuit of the invention may, in general terms, include n threshold differential units U each associated with combination means 38. The number of differential units is selected as a function of the accuracy of the linearization to be obtained. In addition, the type of differential unit, as used individually or in combination, is determined as a function of the signal to be linearized. The linearization performed by the circuit may be adjusted by selecting appropriate resistances for the resistors $25_1$, $25_2$, $33_3$, $33_4$, 41, and 42, and also appropriate values for the reference voltages Vr. The linearization circuit of the invention is clearly of limited cost while still making it possible to perform analog adjustment of the signal.

In addition, it should be observed that the measurement circuit as a whole, i.e. including the detection bridge and the linearization circuit, is made of components that can all be implemented on an integrated circuit.

Figure 5:
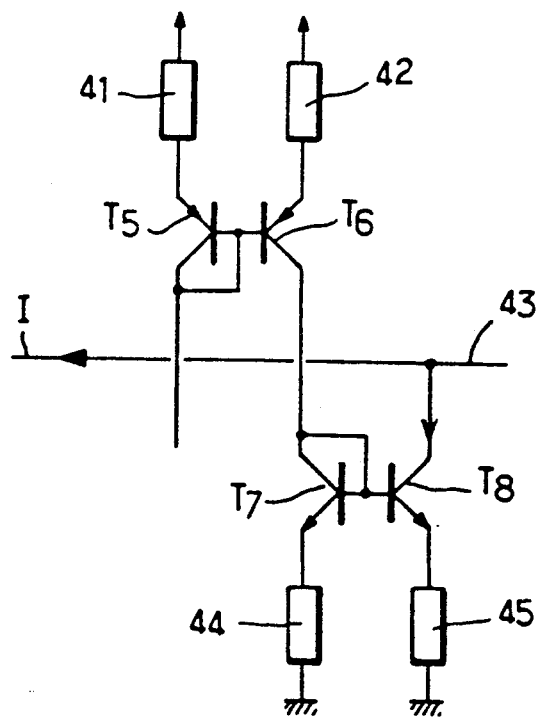
FIG. 5 is the electrical circuit of a characteristic detail of the invention.

It should also be considered that the sign of the slope of the resultant current I can be changed if the combination means 38 provide subtraction rather than addition of the currents delivered by the threshold differential units. To this end, and as shown more clearly in FIG. 5, the collector of transistor $T_6$ is connected to the collector of a transistor $T_7$ whose emitter is connected to ground via a resistor 44. The base of transistor $T_7$ which is connected to its collector is connected to the base of a transistor $T_8$ whose emitter is connected to ground by a resistor 45. The collector of transistor $T_8$ is connected to the collecting line 43 from which the currents $I_1$ to $I_4$ are subtracted. It should be observed that the slope of the variation of the currents can be adapted as a function of the resistances of the resistors 44 and 45.

SUITABILITY FOR INDUSTRIAL APPLICATION

A particularly advantageous application of the invention lies in measuring the variations in the capacitance of a capacitor forming a sensor of mechanical magnitudes, such as force, acceleration, or pressure.

The invention is not limited to the examples described and shown, and numerous modifications may be made thereto without going beyond the ambit of the invention.

I claim:

1. A circuit for measuring variations in the capacitance of a variable capacitor, wherein the circuit comprises:
   an oscillator generating an alternating signal;
   a detection bridge comprising first and second branches connected to the oscillator, the first branch including the variable capacitor connected in series with a variable capacitance diode, while the second branch comprises a capacitor connected in series with a variable capacitance diode;
   a differential stage having its inputs connected to respective ones of the branches at their common points between their capacitors and their variable capacitance diodes;
   a DC bias circuit for biasing the common point of the second branch;
   synchronous demodulation means following the differential stage and connected to the oscillator for delivering a DC unbalance signal; and
   a feedback line injecting the unbalance signal to the common point of the first branch to continuously rebalance the detection bridge.

2. A circuit according to claim 1 wherein the synchronous demodulation means comprise a synchronous detection circuit and a lowpass filter delivering the unbalance signal.

3. A circuit according to claim 1, wherein each input of the differential stage is connected to the common point of a branch by means of a coupling capacitor.

4. A circuit according to claim 1, wherein the common points of the branches are connected respectively to the bias circuit and to the feedback line by means of bias resistors for the variable capacitance diodes.

5. A circuit according to claim 2, wherein the lowpass filter is connected to a linearization circuit for the unbalance signal, the linearization circuit comprising:

a number n of threshold differential units each receiving as inputs the unbalance signal and a respective reference voltage, and each delivering an output signal in the form of a current which varies in a manner that includes a portion of zero slope connected to a portion of determined slope by an angle point defined by the reference voltage; and a number n of means for combining the currents from the differential units, thereby obtaining a resultant signal having multiple angle points which, when combined with the unbalance signal, enables it to be linearized.

6. A circuit according to claim 5, wherein at least one differential unit delivers an output current whose variation includes a zero slope portion for any value of the unbalance signal below the reference voltage, and a determined slope portion for any value of the unbalance signal greater than the reference voltage.

7. A circuit according to claim 5, wherein at least one of the differential units delvers an output current which varies in a manner that includes a zero slope portion for any value of the unbalance signal greater than the reference voltage, and a determined slope portion for any value of the unbalance signal less than the reference voltage.

8. A circuit according to claim 6, wherein each differential unit is constituted by a first transistor having a base connected to the reference voltage and an emitter connected via a resistor to the emitter of a second transistor whose base receives the unbalance signal, while the collector of the first transistor delivers the output current.

9. A circuit according to claim 7, wherein each differential unit is constituted by a first transistor having a base receiving the unbalance signal and an emitter which is connected via a resistor to the emitter of a second transistor whose base is connected to the reference voltage, the collector of the first transistor delivering the output current.

10. A circuit according to claim 8 or 9, wherein the emitter resistors determine the slope of the variation in the output current of the differential units.

11. A circuit according to claim 5, wherein each combination means is formed by a current mirror.

12. A circuit according to claim 11, wherein the current mirrors subtract the output currents delivered by the differential units.

13. A circuit according to claim 11, wherein the current mirrors add the output currents delivered by the differential units.

14. A circuit according to claim 1, wherein the capacitor of said second branch is variable in order to provide differential capacitance detection.

* * * * *